United States Patent
Karadkar et al.

(10) Patent No.: US 12,492,332 B2
(45) Date of Patent: Dec. 9, 2025

(54) STABILIZED $CO_2$ FOAM COMPOSITIONS FOR SUBTERRANEAN FRACTURING APPLICATIONS AND COMPOSITIONS RELATED THERETO

(71) Applicants: SAUDI ARABIAN OIL COMPANY, Dhahran (SA); KING FAHD UNIVERSITY OF PETROLEUM & MINERALS, Dhahran (SA)

(72) Inventors: Prasad Baburao Karadkar, Dhahran (SA); Bader G. Harbi, Dhahran (SA); Safyan A. Khan, Dhahran (SA); Mohammed K. Alsakkaf, Dhahran (SA); Shahid Ali, Dhahran (SA); Muhammad Mansha, Dhahran (SA); Zain H. Yamani, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/318,223

(22) Filed: May 16, 2023

(65) Prior Publication Data
US 2024/0384160 A1 Nov. 21, 2024

(51) Int. Cl.
| | |
|---|---|
| *C09K 8/70* | (2006.01) |
| *C09K 8/80* | (2006.01) |
| *E21B 43/25* | (2006.01) |

(52) U.S. Cl.
CPC .......... *C09K 8/703* (2013.01); *C09K 8/80* (2013.01); *E21B 43/25* (2013.01); *C09K 2208/10* (2013.01)

(58) Field of Classification Search
None
See application file for complete search history.

(56) References Cited

U.S. PATENT DOCUMENTS

| | | |
|---|---|---|
| 7,033,975 B2 | 4/2006 | Baran, Jr. et al. |
| 10,155,899 B2 | 12/2018 | Agrawal et al. |
| 10,801,310 B2 | 10/2020 | Watts et al. |

(Continued)

FOREIGN PATENT DOCUMENTS

| | | | |
|---|---|---|---|
| CN | 102746841 A | * 10/2012 | ............ C09K 8/594 |
| WO | 2021128683 A1 | 7/2021 | |

OTHER PUBLICATIONS

Nabil; "Preparation of crystalline silica (quartz, cristobalite, and tridymite) and amorphous silica powder (one step)"; Journal of Physics and Chemistry of Solids; vol. 121, 2018; p. 22-26. (Year: 2018).*

(Continued)

*Primary Examiner* — Andrew Sue-Ako
(74) *Attorney, Agent, or Firm* — Vorys, Sater, Seymour and Pease LLP

(57) ABSTRACT

Methods and compositions including a $CO_2$ foam treatment fluid having a plurality of functionalized silanol group silica nanoparticles the silanol group selected from the group consisting of an isolated silanol group, a vicinal silanol group, a geminaol silanol group, and any combination thereof; and a surfactant. The $CO_2$ foam treatment fluids can be used for stimulation of subterranean formations for hydrocarbon production.

9 Claims, 8 Drawing Sheets

(56) References Cited

U.S. PATENT DOCUMENTS

| | | | |
|---|---|---|---|
| 10,876,040 | B2 | 12/2020 | Barati Ghahfarokhi et al. |
| 2010/0096139 | A1* | 4/2010 | Holcomb .................. C09K 8/70 166/308.1 |
| 2017/0240800 | A1* | 8/2017 | Li ............................ C09K 8/94 |
| 2023/0002669 | A1 | 1/2023 | Hiraoka et al. |
| 2023/0068743 | A1* | 3/2023 | Watts ..................... C09K 8/594 |
| 2023/0108336 | A1* | 4/2023 | Morales ................. C09K 8/516 166/386 |

OTHER PUBLICATIONS

De Vylder; "A comprehensive model for the role of water and silanols in the amine catalyzed aldol reaction"; Chem. Eng. Journal; vol. 404, 2021, p. 1-13. (Year: 2021).*

CN102746841A translation; Google Patents; <https://patents.google.com/patent/CN102746841A/en>; accessed May 13, 2024. (Year: 2024).*

"HLB Value and Calculation"; Alfa Chemistry; <https://surfactant.alfa-chemistry.com/hlb-value-and-calculation.html>; accessed Jan. 8, 2025. (Year: 2025).*

CO2 Enhanced Oil Recovery. Institute for 21st Century Energy, U.S. Chamber of Commerce (2012).

Jones, S. A., V. van der Bent, Farajzadeh, R., W.R. Rossen, and W. S. Vincent-Bonnieu (2016). Surfactant screening for foam EOR: Correlation between bulk and core-flood experiments. Colloids Surfaces A: Physicochem. Eng. Asp., 500, pp. 166-176.

Enick, R. M., Olsen, D., Ammer, J., and Schuller, W. (2012). Mobility and conformance control for CO2 EOR via thickeners, foams, and gels—A literature review of 40 years of research and pilot tests. SPE-DOE Improved Oil Recovery Symposium Proceedings, 2, pp. 910-921.

Chiquet, P., Daridon, J. L., Broseta, D., and Thibeau, S. (2007). CO2/water interfacial tensions under pressure and temperature conditions of CO2 geological storage. Energy Convers. Manag., 48, pp. 736-744.

Shchukin, E. D. Evgenii D. (Elsevier, 2001). Colloid and surface chemistry.

Heller, J. P. and Kuntamukkula, M. S. (1987). Critical review of the foam rheology literature. Ind. Eng. Chem. Res., 26, pp. 318-325.

Dhanuka, V. V., Dickson, J. L., Ryoo, W., and Johnston, K. P. ((2006). High internal phase CO2-in-water emulsions stabilized with a branched non-ionic hydrocarbon surfactant. J. Colloid Interface Sci., 298, pp. 406-418.

Zhang, Y., Zhang, L., Wang, Y., Wang, M., Wang, Y., and S. Ren (2015). Dissolution of surfactants in supercritical CO2 with co-solvents. Chem. Eng. Res. Des., 94, pp. 624-631.

AlYousef, Z., Almobarky, M., and Schechter, D. (2017). Enhancing the Stability of Foam by the Use of Nanoparticles. Energy & Fuels, 31, pp. 10620-10627.

Singh, R. and Mohanty, K. K. (2015). Synergy between Nanoparticles and Surfactants in Stabilizing Foams for Oil Recovery. Energy & Fuels, 29, pp. 467-479.

Li, S., Li, Z. and Wang, P. (2016). Experimental Study of the Stabilization of CO2 Foam by Sodium Dodecyl Sulfate and Hydrophobic Nanoparticles. Ind. Eng. Chem. Res., 55, pp. 1243-1253.

Sakthivel, S., Adebayo, A. and Kanj, M. Y. (2019). Experimental Evaluation of Carbon Dots Stabilized Foam for Enhanced Oil Recovery. Energy & Fuels, 33, pp. 9629-9643.

Rognmo, Arthur U., Al-Khayyat, Noor, Heldal, Sandra, Vikingstad, Ida, Eide, Øyvind, Fredriksen, Sunniva B., Alcorn, Zachary P., Graue, Arne, Bryant, Steven L., Kovscek, Anthony R., and Martin A. Fernø. "Performance of Silica Nanoparticles in CO2 Foam for EOR and CCUS at Tough Reservoir Conditions." SPE J. 25 (2020): 406-415.

Hurtado, Y., Beltrán, C., Zabala, R. D., Lopera, S. H., Franco, C. A., Nassar, N. N., & Cortés, F. B. (2018). Effects of Surface Acidity and Polarity of SiO2 Nanoparticles on the Foam Stabilization Applied to Natural Gas Flooding in Tight Gas-Condensate Reservoirs. Energy and Fuels, 32(5), 5824-5833.

* cited by examiner

| Time | 0% 1:3 DMDES | 0.001% 1:3 DMDES | 0.01% 1:3 DMDES | 0.1% 1:3 DMDES |
|---|---|---|---|---|
| 63(s) | | | | |
| 150(s) | | | | |
| 250(s) | | | | |
| 350(s) | | | | |
| 450(s) | | | | |
| 550(s) | | | | |
| 650(s) | | | | |
| 750(s) | | | | |

FIG. 7B

STABILIZED $CO_2$ FOAM COMPOSITIONS FOR SUBTERRANEAN FRACTURING APPLICATIONS AND COMPOSITIONS RELATED THERETO

FIELD OF THE DISCLOSURE

The present disclosure relates generally to stimulation operations in the oil and gas industry and, more particularly, to methods to optimize stabilization of $CO_2$ foam compositions for subterranean fracturing applications and compositions related thereto.

BACKGROUND OF THE DISCLOSURE

Stimulation operations are commonly used during oil and gas production to increase the productivity of a subterranean formation reservoir by increasing the permeability of the formation matrix. Common stimulation operations include hydraulic fracturing techniques.

Hydraulic fracturing operations involve pumping a fracturing fluid into a portion of a subterranean formation at a rate and pressure such that the subterranean formation breaks down and one or more fractures are formed. Typically, solid particulates are then deposited in the fractures. These solid particulates, or "proppant," serve to prevent the fractures from fully closing once the hydraulic pressure is removed by forming a proppant pack. By keeping the fracture from fully closing, the proppant aids in forming conductive paths through which hydrocarbon fluids may flow.

In some cases, hydrocarbon production may be enhanced by supplementing hydraulic fracturing operations with enhanced oil recovery (EOR) techniques, particularly in unconventional reservoirs, such as tight oil/gas reservoirs. EOR techniques are used to increase the recovery of production fluids (e.g., hydrocarbons) by restoring formation pressure and improving fluid flow in the formation. EOR techniques typically involve injection of a substance that is not naturally occurring in a hydrocarbon-bearing formation. One EOR technique involves introducing a flooding composition into the subterranean formation reservoir in order to pressurize the formation and drive hydrocarbons toward one or more production wells. Such flooding compositions may be gas (e.g., carbon dioxide, natural gas, nitrogen, and the like), a thermal composition (e.g., steam, fire, and the like), and/or a chemical (e.g., surfactant, polymer, microbial, and the like), a supercritical liquid, for example.

Foamed treatment fluids comprising surfactants may be used to enhance the performance of a hydrocarbon-producing subterranean formation reservoir as part of a fracturing system. Such treatment fluids may further provide functionality as wetting agents, detergents, dispersants, and the like. Foamed treatment fluids are viscous and injected into a formation to dramatically increase fluid pressure in a subterranean formation by encouraging the flow of hydrocarbon fluids through a reservoir media in which the hydrocarbon fluid flow was so low that its recovery was uneconomical. Indeed, in one example, 350,000 barrels of oil (corresponding to over 6% of the U.S. domestic oil production) was recovered each day by high pressure injection of $CO_2$ obtained from natural underground reservoirs from industrial process byproducts. Moreover, it has been projected that increased production from $CO_2$-based EOR operations may create 375,000 jobs by the year 2030. However, foam is an inherent thermodynamically unstable colloidal system in which a gas is dispersed in a continuous liquid phase stabilized by surfactants that can rupture spontaneously.

In view of the foregoing, foamed treatment fluids exhibiting enhanced foam stability following introduction into a subterranean formation are highly desired.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided including introducing a $CO_2$ foam treatment fluid into a subterranean formation. The $CO_2$ foam treatment fluid includes a plurality of functionalized silanol group silica nanoparticles, the silanol group selected from the group consisting of an isolated silanol group, a vicinal silanol group, a geminaol silanol group, and any combination thereof; and a surfactant.

In another embodiment, a CO2 foam treatment fluid is provided. The $CO_2$ foam treatment fluid includes a plurality of functionalized silanol group silica nanoparticles, the silanol group selected from the group consisting of an isolated silanol group, a vicinal silanol group, a geminaol silanol group, and any combination thereof; and a surfactant.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 7B are images visualizing the results of FIG. 7A.

DETAILED DESCRIPTION

Figure 1:
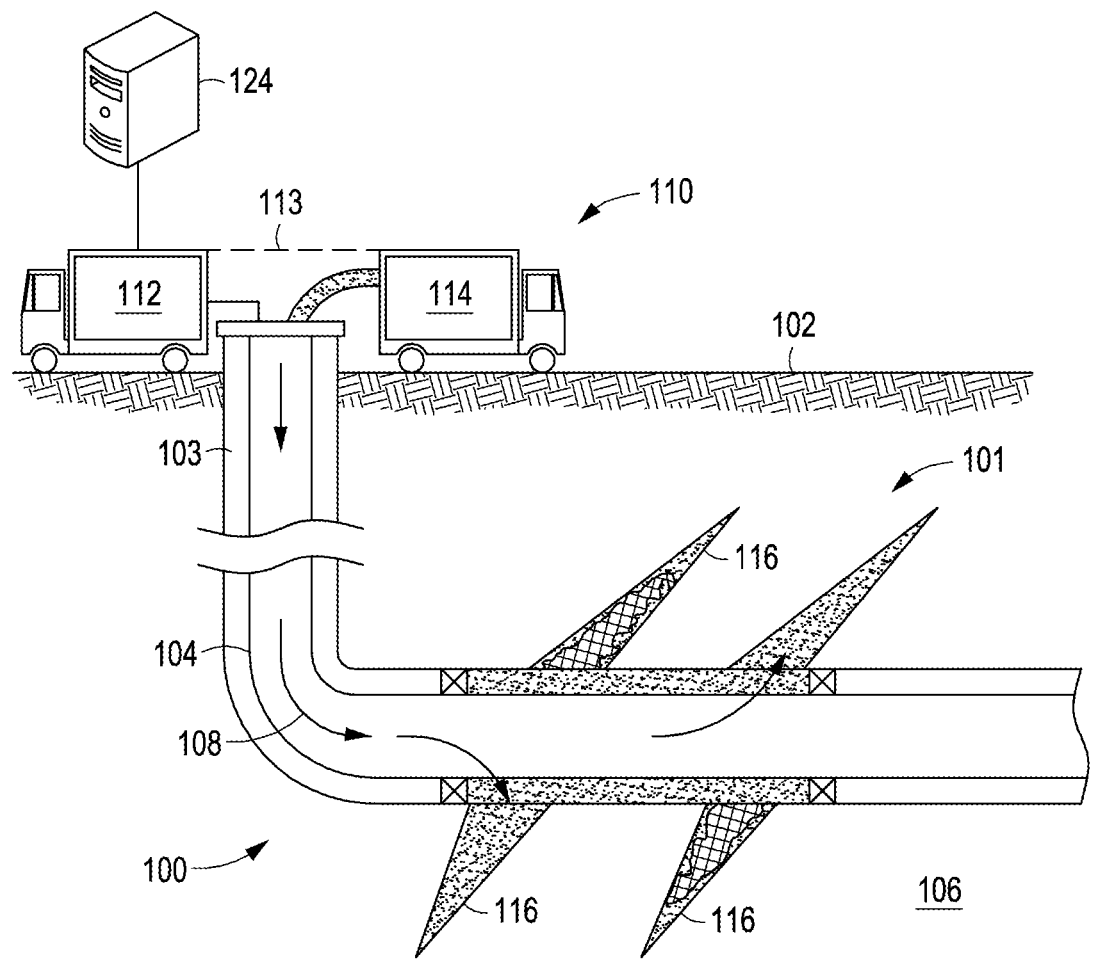
FIG. 1 is a schematic diagram of an example well system that may incorporate the principles of the present disclosure.

Embodiments of the present disclosure will now be described in detail with reference to the accompanying Figures. Like elements in the various Figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to stimulation operations in the oil and gas industry and, more particularly, to methods to optimize the stability of $CO_2$ foam compositions for subterranean fracturing applications and compositions related thereto.

The present disclosure provides a method to optimize the stability of $CO_2$ foam treatment fluids by the addition of functionalized silica ($SiO_2$) nanoparticles (NPs) and a surfactant(s). As used herein, the term "treatment fluid," and grammatical variants thereof, does not imply any particular action by the fluid or any component thereof. Herein, the $CO_2$ foam treatment fluids may be used as part of a fracturing system, such as either a hydraulic fracturing treatment or an EOR treatment. The availability of a stabilized $CO_2$ foam treatment fluid is of interest, particularly as part of a hydraulic fracturing system (e.g., hydraulic fracturing or EOR), because, compared to conventional treatment fluids, stabilized $CO_2$ foam treatment fluids provide a greener way to extract hydrocarbon fluids, a reduction in the amount of water necessary to extract hydrocarbon fluids, and a reduction in economic impact for oil and gas companies (e.g., conventional treatment fluid additives, such as polymer and gels, can be quite expensive).

As described above, foam is a thermodynamically unstable colloidal system in which gas is dispersed in a continuous liquid phase stabilized by surfactants that can rupture spontaneously, particularly under reservoir conditions. Stabilizing $CO_2$ foam is challenging for a number of reasons. The solubility of gases in water has an adverse effect on the stability of foam because it can promote foam coalescence; moreover, the difference in pressure between unequally sized foam bubbles can cause gas transfer from smaller to larger bubbles, leading to an irreversible formation of bubbles of a larger size. For use in a subterranean formation treatment fluid, $CO_2$ becomes more water-soluble at high-pressure reservoir conditions, which limits its use in a treatment fluid. However, beneficially, the interfacial tension of the $CO_2$/water system is quite low as compared to the $N_2$/water system, which can advantageously accelerate foamability.

As provided herein, the present disclosure provides a method for optimizing the stability of $CO_2$ foam treatment fluids by at least including functionalized silica NPs and one or more surfactants (e.g., a mixture of two surfactants or more). An additional challenge and critical factor that influences $CO_2$ foam stability is the hydrophilic-lipophilic balance (HLB) of the selected surfactant. The HLB value depends upon the size and strength of hydrophilic and lipophilic moieties of a surfactant molecule. Generally, surfactants with HLB values between 4 and 6 are suitable for stabilizing water-in-oil (w/o) emulsions, while surfactants with HLB values in the range of 8-18 are better suited for stabilizing oil-in-water (o/w) emulsions. The hydrophilicity of a surfactant can be increased, which in turn can reduce the interfacial tension of the surfactant, to promote the formation of foams. To some extent, with the increase of a surfactant's hydrophilicity, the surfactant molecules can form a better arrangement at the interface. As hydrophilicity and hydrophobicity strike the right balance, surfactant molecules arrange themselves more closely to produce a thick monolayer. Conversely, a large increase in the HLB value of a surfactant can lead to a weaker arrangement of surfactant molecules at the interface. Therefore, a strong interaction between water and surfactant molecules can draw surfactant molecules towards the water, which forms a thin liquid film. Thus, having an optimal HLB value can establish precise interactions, which then produce highly stable $CO_2$ foams.

With the increase of pressure under isothermal, reservoir conditions, $CO_2$ density and cohesive energy both increase. With these increases, the $CO_2$ becomes more hydrophobic (e.g., more oil-like) as the HLB value increases. Hydrophobic $CO_2$ can strengthen interactions with hydrocarbon surfactant tails embedded into the $CO_2$ phase, thereby enhancing interaction between the $CO_2$ and surfactant molecules; hydrophilic surfactant head groups provide a balance in terms of HLB. Consequently, surfactants with comparatively high HLB values are generally favorable for $CO_2$ foams at high pressures. Conversely, if a surfactant with a high HLB value has significantly high hydrophilicity as compared to hydrophobicity, it can be more drawn into the water phase, thus weakening foam stability.

The present disclosure achieves $CO_2$ foam stabilization by inclusion in a treatment fluid of functionalized silica NPs, such that the NPs remain in lamellar phases and stabilize a thin, liquid film of $CO_2$ foam. More particularly, the functionalized silica NPs are designed to overcome factors that destabilize foam, such as a foam's lamellae thinning, water drainage, and inter-bubble gas diffusions, for example. The optimal HLB value of a surfactant is determined to establish the precise interaction with the functionalized silica NPs, resulting an optimized stable $CO_2$ foam treatment fluid, according to the embodiments of the present disclosure.

As described herein, the methods of optimizing the stability of $CO_2$ foam treatment fluids lower the permeability of $CO_2$ through a foam film by increasing the quantity of adsorbed surfactant at the surface of the foam film using functionalized silica NPs that reduce the contact area at the $CO_2$-liquid interface.

NPs are known to station themselves at the gas-liquid interface, as well as at the plateau border of a foam to act as a steric barrier. Further, the positioning of the NPs at the gas-liquid interface can assist in achieving the maximum or near-maximum threshold of capillary pressure and also decrease liquid drainage, which reduces gas diffusion to control bubble rupture and coalescence.

Silica NPs are used in the methods of the present disclosure because they are low in cost due to the relative low cost of silica, are readily commercially available in a range of nano-sizes, and are generally considered non-toxic and thus are considered environmentally friendly. Further, silica NPs exhibit nano-porosity, which can be an advantage in viscoelastic formulations (treatment fluids) due to entrapped air within the nano-porosity, the air having a very low thermal conductivity. Indeed, silica NPs maintain high thermal stability (e.g., greater than about 275° F.), allowing for use in conditions with high pressure, high temperature, or a combination thereof (e.g., reservoir conditions).

The methods of the present disclosure include functionalization of silica NPs to achieve optimum or near-optimum HLB balance. In particular, functionalization of the silica NPs surface is used to make the silica NPs preferentially dispersed in aqueous or non-aqueous media to influence HLB; the hydrophilic or hydrophobic behavior of any solid is primarily governed by surface groups. In one or more instances, for example, silica NPs having surface hydroxyl groups, such as by pyrolytic or precipitative means, are generally hydrophilic. Conversely, silica NPs functionalized with hydrocarbon or long-chain alkyl groups, are generally hydrophobic.

The zeta potential of a foamed suspension, such as the $CO_2$ foam treatment fluids of the present disclosure comprising the functionalized silica NPs and surfactant described herein, can significantly influence foam stability. As used herein, the term "zeta potential," and grammatical variants thereof, refers to the charge that develops at the interface between a particle and its liquid medium (liquid suspension). A stronger attraction between a surfactant and the functionalized silica NPs in the $CO_2$ foams treatment fluids described herein can limit the number of functionalized silica NPs at the gas-liquid interface and cause lamella thinning, as well as liquid drainage, and gas bubble rupturing. Conversely, neutrally charged functionalized silica NPs exhibit limited interaction with all surfactant types (i.e., anionic, cationic, non-ionic, zwitterionic). Positioning of a greater number of functionalized silica NPs at the gas-liquid interface increases surface tension and, in turn, increases foam bubble strength. Generally, a zeta potential below 30 millivolts (mV) promotes foam instability because having strong inter-particle repulsion forces prevents forming a densely packed particle arrangement at liquid/gas interfaces.

The surfactants for use in the methods of the present disclosure for optimizing the stability of $CO_2$ foam treatment fluids are critical to stabilizing the foam, are commercially readily available, and maintain high thermal stability, allowing for use in conditions with high pressure, high temperature, or a combination thereof (e.g., reservoir conditions). Indeed, maintaining a foam in high temperature environments poses a challenge to the stability of a foam due to temperature influence upon Brownian motion, viscosity, and critical micelle concentration, for example, which can be overcome at least partially by a surfactant.

Suitable surfactant for use in $CO_2$ foam treatment fluids of the present disclosure include, but are not limited to, an anionic surfactant, a cationic surfactant, a non-ionic surfactant, a zwitterionic surfactant, and any combination thereof. Specific examples of surfactants for use in the $CO_2$ foam treatment fluids of the present disclosure include, but are not limited to, sodium dodecyl sulfate (SDS, anionic surfactant), cetyltrimethyl ammonium bromide (CTAB, cationic surfactant), alkyl polyglucoside (APG-1214, non-ionic surfactant), and ethoxylated coco amine (zwitterionic surfactant), and any combination thereof. In some instances, a combination of surfactants may be preferred.

As described below, the methods for optimizing the stability of $CO_2$ foam treatment fluids, and the resultant $CO_2$ foam treatment fluids, include $CO_2$ flow rate to form foam, surfactant concentration related to foam height, and functionalized silica NP zeta potential to determine attraction between functionalized NPs and a surfactant.

In one or more embodiments, the flow rate of $CO_2$ for use in the methods of the present disclosure for optimizing the stability of a $CO_2$ foam treatment fluid may be in the range of about 0.2 liters per min (L/min) to about 1.0 L/min, encompassing any value and subset therebetween, such as about 0.2 L/min to about 0.3 L/min, or about 0.3 L/min to about 0.4 L/min, or about 0.4 L/min to about 0.5 L/min, or about 0.5 L/min to about 0.6 L/min, or about 0.6 L/min to about 0.7 L/min, or about 0.7 L/min to about 0.8 L/min, or about 0.8 L/min to about 0.9 L/min, or about 0.9 L/min to about 1.0 L/min, or about 0.2 L/min to about 0.5 L/min, or about 0.5 L/min to about 1.0 L/min, or about 0.2 L/min to about 0.6 L/min, encompassing any value and subset therebetween.

The concentration of the surfactant for use in the methods of the present disclosure for optimizing the stability of a $CO_2$ foam treatment fluid is highly dependent on the particularly selected surfactant for use in forming the $CO_2$ foam treatment fluid. For example, a cationic surfactant (e.g., CTAB) may be evaluated for optimization at a concentration of about 0.2 millimoles (mM) to about 1.0 mM, encompassing any value and subset therebetween, such as about 0.2 mM to about 0.3 mM, or about 0.3 mM to about 0.4 mM, or about 0.4 mM to about 0.5 mM, or about 0.5 mM to about 0.6 mM, or about 0.6 mM to about 0.7 mM, or about 0.7 mM to about 0.8 mM, or about 0.8 mM to about 0.9 mM, or about 0.9 mM to about 1.0 mM, or about 0.2 mM to about 0.8 mM, or about 0.5 mM to about 0.8 mM, encompassing any value and subset therebetween. Differently, for example, an anionic surfactant (e.g., SDS) may be evaluated for optimization at a concentration of about 2.0 mM to about 10.0 mM, encompassing any value and subset therebetween, such as about 2.0 mM to about 3.0 mM, or about 3.0 mM to about 4.0 mM, or about 4.0 mM to about 5.0 mM, or about 5.0 mM to about 6.0 mM, or about 6.0 mM to about 7.0 mM, or about 7.0 mM to about 8.0 mM, or about 8.0 mM to about 9.0 mM, or about 9.0 mM to about 10.0 mM, or about 2.0 mM to about 8.0 mM, or about 5.0 mM to about 8.0 mM.

For non-ionic and zwitterionic surfactants, the concentration may be in the range of about 0.1 wt. % to about 1.0 wt. %, encompassing any value and subset therebetween, such as about 0.1 wt. % to about 0.5 wt. %, or 0.5 wt. % to about 1.0 wt. %, or about 0.25 wt. % to about 0.5 wt. %, or about 0.1 wt. % to 0.75 wt. %.

The silica NPs of the present disclosure may be crystalline silica or non-crystalline (amorphous) silica.

The silica NPs of the present disclosure are silica particles having an average diameter in the range of about 1 nanometer (nm) to about 100 nm, encompassing any value and subset therebetween, such as about 1 nm to about 25 nm, or about 25 nm to about 50 nm, or about 50 nm to about 75 nm, or about 75 nm to about 100 nm, encompassing any value and subset therebetween. In some instances, the silica NPs are in the range of about 1 nm to less than about 50 nm, or about 1 nm to less than about 25 nm, or about 1 nm to less than about 10 nm, encompassing any value and subset therebetween. Smaller silica NPs may be preferred due to their high surface area, improved dispersion, and improved foam stability, for example.

Functionalization of silica NPs may be carried out by various functionalization methods, without limitation. Examples of suitable functionalization methods include, but are not limited to, direct functionalization methods and indirect functionalization methods. Direct functionalization methods include, for example, covalent functionalization, non-covalent functionalization, inorganic functionalization, doping or heteroatoms functionalization, immobilization mediated functionalization; direct functionalization may be achieved by co-condensation and in situ, for example. Indirect functionalization methods include, for example, grafting functionalization, such as by surface polymerization. Functionalization of silica NPs may involve functionalization of surface silanol groups (Si—OH), such as isolated silanol groups, vicinal silanol groups (hydrogen bonded with a neighboring silanol group), geminaol silanol groups, and any combination thereof. These functionalized silica NPs may be referred to herein as "functionalized silanol group silica nanoparticles."

Functionalization of a surface silanol group may be achieved using a silane, for example, such as a silane containing propyl, methyl, and/or octyl groups. Examples of specific silanes suitable for functionalization of silica NPs include, but are not limited to, dimethyl diethoxy silane (DMDES), 3-aminopropyl triethoxy silane (APTES), methyl poly(ethylene glycol) silane (mPEG silane), ethoxy trimethyl silane (TMEO), dimethoxy dimethyl silane (DMDMO), propyl triethoxy silane (PTEO), trimethoxy propyl silane (PTMO), octyl triethoxy silane (OTEO), and the like, and any combination thereof. Combinations of two or more silanes may be used, for example, to develop partial hydrophobic functionality.

The zeta potential of the $CO_2$ foam treatment fluids comprising the functionalized silica NPs and surfactant of the present disclosure is expressed as an absolute value and may be in the range of 30 mV to about 40 mV, encompassing any value and subset therebetween, such as in the range of 30 mV to about 32 mV, or about 32 mV to about 34 mV, or about 34 mV to about 36 mV, or about 36 mV to about 38 mV, or about 38 mV to about 40 mV, encompassing any value and subset therebetween.

The $CO_2$ foam treatment fluids of the present disclosure may exhibit greater foam heights compared to conventional foam treatment fluids lacking functionalized silica NPs. In one or more aspects of the present disclosure, the foam height of the bubbles of the $CO_2$ foam treatment fluids described herein may be in the range of about 100 mm to about 200 mm, encompassing any value and subset therebetween, such as in the range of about 100 mm to about 125 mm, or about 125 mm to about 150 mm, or about 150 mm to about 175 mm, or about 175 mm to 200 mm, encompassing any value and subset therebetween.

The optimization methodology for achieving improved stability of $CO_2$ foam treatment fluids is described in detail in the Examples section below.

CO$_2$ Foam Treatment Fluids and Related Methods

Compositions of the present disclosure may be formed to a $CO_2$ foam treatment fluid for use in a subterranean formation. $CO_2$ foam treatment fluids of the present disclosure may comprise a plurality of the, previously described, functionalized silica NPs, and optionally additives.

The $CO_2$ foam treatment fluid of the present disclosure may comprise any suitable aqueous fluid for use in stimulation of subterranean formations for hydrocarbon production. Example aqueous fluids may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), the like, or any combination thereof.

The flow rate of $CO_2$ forming the $CO_2$ foam treatment fluid (and its use in hydraulic fracturing systems) may be in the range of about 0.2 mM to about 10 mM in the total liquid portion of the $CO_2$ foam treatment fluid, encompassing any value and subset therebetween, such as about 0.2 mM to about 1.0 mM, or about 1.0 mM to about 2.5 mM, or about 2.5 mM to about 5.0 mM, or about 5.0 mM to about 7.5 mM, or about 7.5 mM to about 10.0 mM, encompassing any value and subset therebetween.

Depending on the particular surfactant or surfactants, the concentration of surfactant in the $CO_2$ foam treatment fluid may be in the range of about 0.2 mM to about 10 mM in the total liquid portion of the $CO_2$ foam treatment fluid, encompassing any value and subset therebetween, such as about 0.2 mM to about 1.0 mM, or about 1.0 mM to about 2.5 mM, or about 2.5 mM to about 5.0 mM, or about 5.0 mM to about 7.5 mM, or about 7.5 mM to about 10.0 mM, encompassing any value and subset therebetween.

When the $CO_2$ foam treatment fluids are used in hydraulic fracturing and/or EOR, the proppant may be present in the $CO_2$ foam treatment fluid of the present disclosure in an amount in the range of from a lower limit of about 0.1 pound per gallon (lbm/gal), 1 lbm/gal, 2 lbm/gal, 3 lbm/gal, 4 lbm/gal, 5 lbm/gal, 6 lbm/gal, 7 lbm/gal, 8 lbm/gal, 9 lbm/gal, and 10 lbm/gal to an upper limit of about 20 lbm/gal, 19 lbm/gal, 18 lbm/gal, 17 lbm/gal, 16 lbm/gal, 15 lbm/gal, 14 lbm/gal, 13 lbm/gal, 12 lbm/gal, 11 lbm/gal, and 10 lbm/gal of the $CO_2$ foam treatment fluid, encompassing any value and subset therebetween.

The $CO_2$ foam treatment fluids described herein may further include one or more additional components suitable for achieving one or more desired functions (e.g., in addition to the stimulation operation in question). Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art.

In some embodiments, the $CO_2$ foam treatment fluids disclosed herein (including mixing of individual components or mixtures thereof) may be mixed at a remote location from a job site and shipped thereto or, in other embodiments, the $CO_2$ foam treatment fluids may be mixed at a job site. In still other embodiments, the treatment fluid may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling treatment fluids for use in stimulation operations of the present disclosure may include one or more mixing and/or storage tanks used for mixing and/or storing, respectively, treatment fluids prior to use in a stimulation operation. Additional tanks may be used for storing spent or partially spent treatment fluid removed from a subterranean formation as part of a stimulation operation. Following a stimulation operation, the $CO_2$ foam treatment fluids or a spent or partially spent variant thereof may be produced from the subterranean formation during aqueous fluid flowback.

Hydraulic Fracturing and Stimulation Well Systems

It is to be noted that the optimized stable $CO_2$ foam treatment fluids prepared according to the methods described herein may be used during a hydraulic fracturing operation or EOR operation, for example. By way of example, FIG. 1 depicts an example well system 100 for performing a hydraulic fracturing treatment (or operation) in a subterranean formation 101. Fracturing treatments can be used, for example, to form or propagate fractures in a rock layer by injecting pressurized stable $CO_2$ foam treatment fluid. The fracture treatment can include an acid treatment to enhance or otherwise influence production of petroleum, natural gas, coal seam gas, or other types of reservoir resources. The example well system 100 includes an injection system 110 that applies stable $CO_2$ foam treatment fluid 108 to a reservoir 106 in the subterranean zone 101. The subterranean zone 101 can include a formation, multiple formations or portions of a formation, and may be conventional or unconventional formations. The injection system 110 includes control trucks 112, pump trucks 114, a wellbore 103, a working string 104, and other equipment. In the example shown in FIG. 1, the pump trucks 114, the control trucks 112, and other related equipment are above the surface 102, and the wellbore 103, the working string 104, and other equipment are beneath the surface 102. An injection system can be configured as shown in FIG. 1 or in a different manner and it can include additional or different features as appropriate, including multiple pump trucks 114 and/or multiple control trucks 112, without departing from the scope of the present disclosure. The injection system 110 can be deployed in any suitable environment, for example, via skid equipment, a marine vessel, sub-sea deployed equipment, or other types of equipment.

The wellbore 103 shown in FIG. 1 includes vertical and horizontal sections. Generally, a wellbore can include horizontal, vertical, slant, curved, and other types of wellbore geometries and orientations, and the fracturing treatment can generally be applied to any portion of a subterranean zone 101. The wellbore 103 can include a casing that is cemented or otherwise secured to the wellbore wall. The wellbore 103 can be uncased or include uncased sections. Perforations can be formed in the casing to allow the stable $CO_2$ foam treatment fluid and/or other materials to flow into the reservoir 106. Perforations can be formed using shape charges, a perforating gun, and/or other tools.

The pump trucks 114 can include mobile vehicles, immobile installations, skids, hoses, tubes, fluid tanks or reservoirs, pumps, valves, and/or other suitable structures and equipment. The control trucks 112 can receive data from, or otherwise communicate with, a computing system 124 that monitors one or more aspects of the fracturing operation. The pump trucks 114 can communicate with the control trucks 112, for example, by a communication link 113. The pump trucks 114 are coupled to the working string 104 to communicate the stable $CO_2$ foam treatment fluid 108 into the wellbore 103. The working string 104 can include coiled tubing, sectioned pipe, and/or other structures that communicate fluid through the wellbore 103. The working string 104 can include flow control devices, bypass valves, ports, and or other tools or well devices that control the flow of fluid from the interior of the working string 104 into the reservoir 106.

Accordingly, systems for introduction of the stabilized $CO_2$ treatment fluids prepared according to the methods described herein into a wellbore in conjunction with a stimulation operation comprise a pump fluidly coupled to a tubing, the tubing located at least partially within the wellbore and the tubing containing a treatment fluid for a desired stimulation operation. The "pump" described herein may comprise a single pump or may comprise one or more pumps which may include "high pressure" and "low pressure" pump(s) in any combination. A "high pressure" pump, i.e., a pump operating at a pressure greater than about 1000 psi, may be used in stimulation operations according to the present disclosure such as acid fracturing where fracturing of the subterranean formation at a pressure higher than the fracture gradient pressure is required. A "low pressure" pump, i.e., a pump operating at a pressure of about 1000 psi or less, may be used in stimulation operations such as EOR flooding where lower pressures are needed and where fracturing of the subterranean formation is not required. Given the benefit of the present disclosure, one having ordinary skill in the art will be able to select an appropriate pump or combination of pumps for a given stimulation operation.

It should be noted that additional nonlimiting components may be present in systems suitable to introduce the stabilized $CO_2$ foam treatment fluids to a subterranean formation reservoir and to recover fluid from the subterranean formation following stimulation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed stabilized $CO_2$ foam treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

Embodiments disclosed herein include:

Embodiment A: A method comprising: introducing a $CO_2$ foam treatment fluid into a subterranean formation, wherein the $CO_2$ foam treatment fluid comprises: a plurality of functionalized silanol group silica nanoparticles, the silanol group selected from the group consisting of an isolated silanol group, a vicinal silanol group, a geminaol silanol group, and any combination thereof; and a surfactant.

Embodiment B: A $CO_2$ foam treatment fluid comprising: a plurality of functionalized silanol-group silica nanoparticles, the silanol group selected from the group consisting of an isolated silanol group, a vicinal silanol group, a geminaol silanol group, and any combination thereof; and a surfactant.

Embodiments A and B may have one or more of the following additional elements in any combination:

Element 1: wherein the plurality of functionalized silanol group silica nanoparticles comprise crystalline silica.

Element 2: wherein the plurality of functionalized silanol group silica nanoparticles comprise non-crystalline silica.

Element 3: wherein the silanol group is functionalized with a silane.

Element 4: wherein the silanol group is functionalized with a silane containing one or more of a propyl group, a methyl group, or an octyl group.

Element 5: wherein the silanol group is functionalized with a silane selected from the group consisting of dimethyl diethoxy silane, 3-aminopropyl triethoxy silane, methyl poly (ethylene glycol) silane, ethoxy trimethyl silane, dimethoxy dimethyl silane, propyl triethoxy silane, trimethoxy propyl silane, octyl triethoxy silane, and any combination thereof.

Element 6: wherein the surfactant is selected from the group consisting of an anionic surfactant, a cationic surfactant, a non-ionic surfactant, a zwitterionic surfactant, and any combination thereof.

Element 7: wherein the surfactant is selected from the group consisting of sodium dodecyl sulfate, cetyltrimethyl ammonium bromide, alkyl polyglucoside, ethoxylated coco amine, and any combination thereof.

Element 8: wherein the plurality of functionalized silanol group silica nanoparticles have an average diameter in the range of about 1 nanometer to about 100 nanometers.

Element 9: wherein the $CO_2$ foam treatment fluid has an absolute value zeta potential in the range of about 30 millivolts to about 40 millivolts.

Element 10: wherein the $CO_2$ foam treatment fluid has a foam height in the range of about 100 millimeters to about 200 millimeters.

By way of non-limiting example, exemplary combinations applicable to Embodiment A include any one, more, or all of Elements 1-10 without limitation.

By way of non-limiting example, exemplary combinations applicable to Embodiment B include any one, more, or all of Elements 1-10 without limitation.

To facilitate a better understanding of the embodiments described herein, the following examples of various representative embodiments are given. In no way should the following examples be read to limit, or to define, the scope of the present disclosure.

EXAMPLES

In the following examples, commercially available silica NPs and surfactants (CTAB surfactant or SDS surfactant) were utilized to demonstrate the methodology for optimizing the stability of a $CO_2$ foam treatment fluid. Optimization was performed to achieve appropriate HLB values to overcome water drainage, $CO_2$ diffusion rate, and rupturing of foam at high temperatures.

Example 1: Optimization of Foam Formulation

Figure 2:
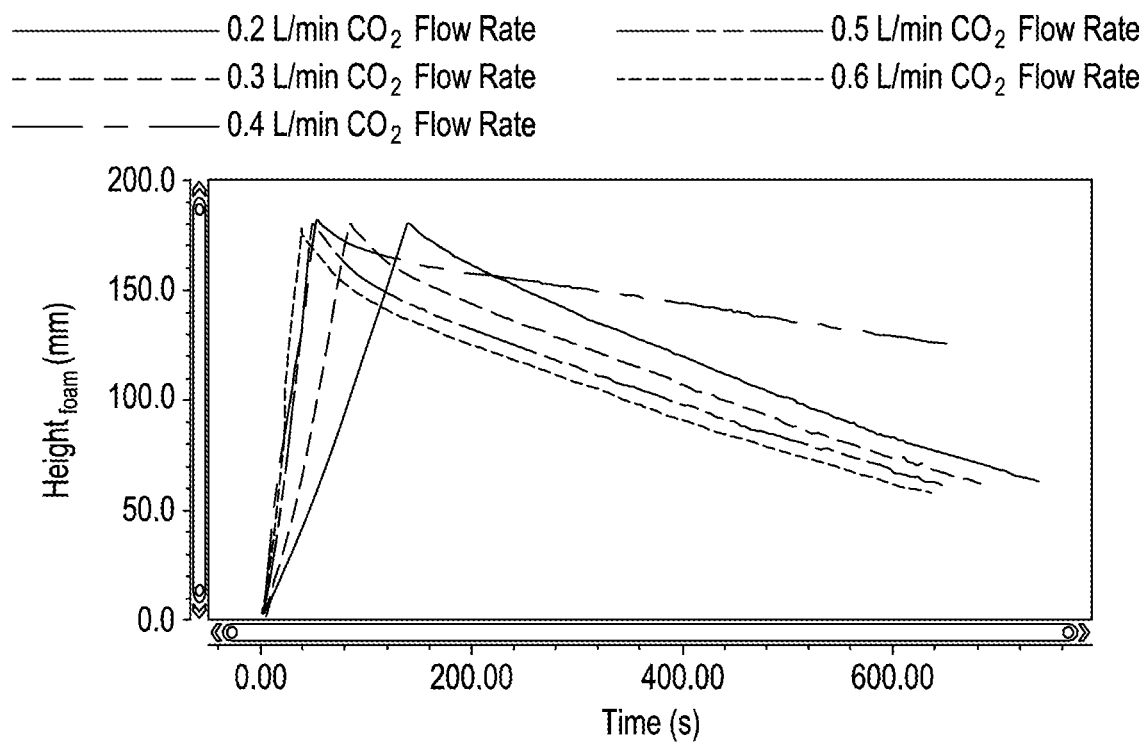
FIG. 2 is a graph evaluating the flow rate of $CO_2$ in CTAB surfactant based on $CO_2$ foam height, according to one or more principles of the present disclosure.

Example 1.1: $CO_2$ Gas Flow Rate in CTAB Surfactant: In this Example, the optimization of a $CO_2$ foam treatment fluid was performed using 0.9 millimolar (mM) CTAB surfactant in water in the presence of silica NPs (average diameter of 7 nm). The effect of flow rate of $CO_2$ on foam height (mm) was evaluated at various flow rates of 0.2 L/min, 0.3 L/min, 0.4 L/min, 0.5 L/min, and 0.6 L/min, with a foaming time of less than 100 s (e.g., between 30 s and 60 s) using DFA100 Dynamic Foam Analyzer (Kruss, Germany) (other foam analyzers could also be used for all Examples herein). The results are shown in FIG. 2. As shown, the maximum foam height of about 180 mm was obtained at a $CO_2$ flow rate of 0.4 L/min. Moreover, the half-life of the foam at 0.4 L/min showed a superior foam half-life compared to the other $CO_2$ flow rates. Accordingly, and as shown in FIG. 2, at 0.4 L/min $CO_2$ flow rate in the presence of a CTAB surfactant and silica NPs, the produced foam has superior stability and foam half-life.

Figure 3:
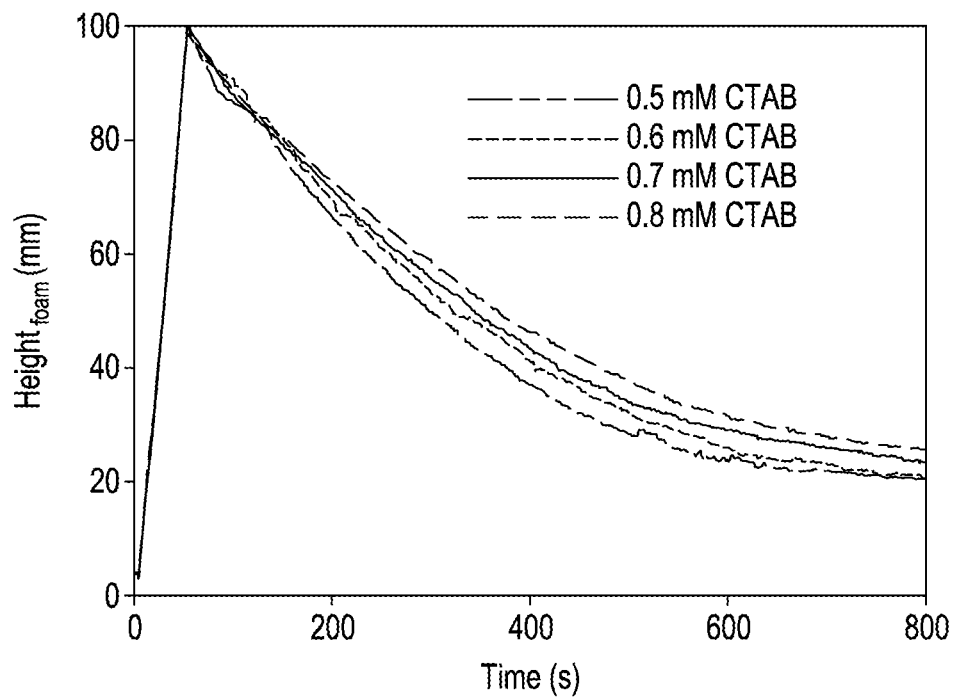
FIG. 3 is a graph evaluating the concentration of CTAB surfactant having $CO_2$ flowed therethrough based on $CO_2$ foam height, according to one or more principles of the present disclosure.

Example 1.2: CTAB Surfactant Concentration: In this Example, the optimization of a $CO_2$ foam treatment fluid was performed using a CTAB surfactant absent silica NPs, a 0.4 L/min $CO_2$ flow rate, and a foaming time of 50 s using the DFA100. That is, the applicable variables determined in Example 1.1 remained constant, but the concentration of CTAB was varied at 0.5 mM, 0.6 mM, 0.7 mM, and 0.8 mM in water. The results are shown in FIG. 3. As shown, the results indicate that 0.8 mM CTAB surfactant produces the most stable foam and best foam half-life.

Figure 4:
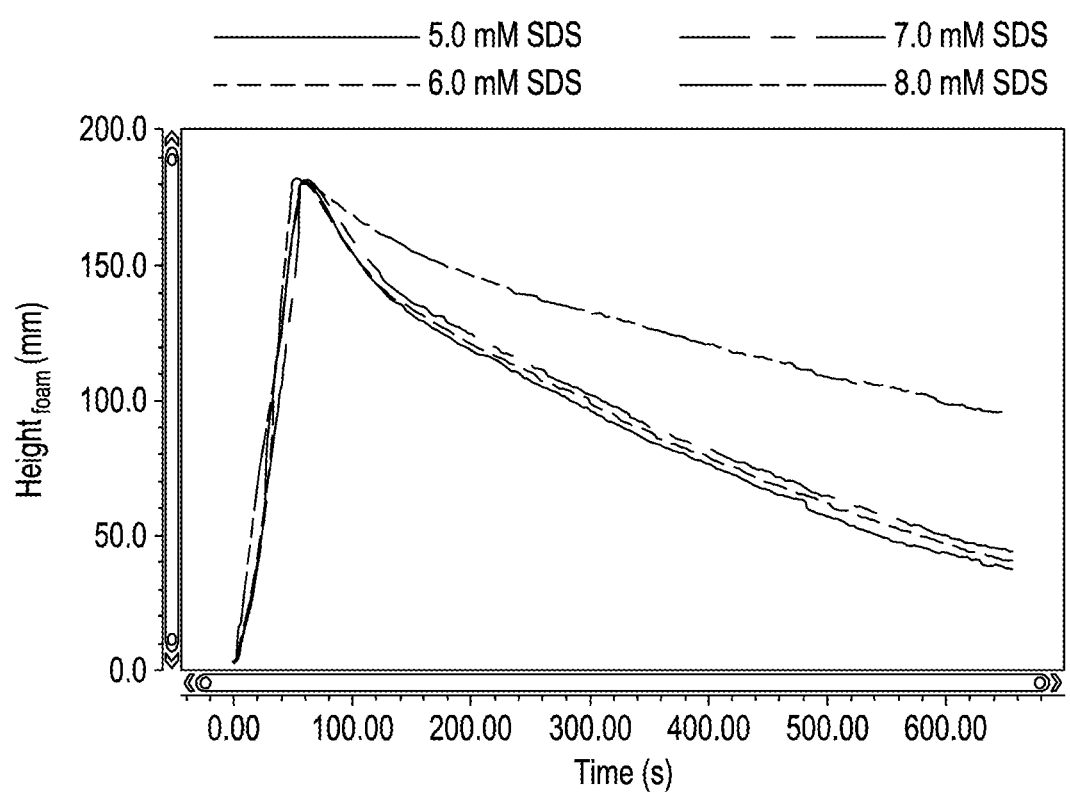
FIG. 4 is a graph evaluating the concentration of SDS surfactant having $CO_2$ flowed therethrough based on $CO_2$ foam height, according to one or more principles of the present disclosure.

Example 1.3: CTAB Surfactant Concentration: In this Example, the optimization of a $CO_2$ foam treatment fluid was performed using an SDS surfactant absent silica NPs, a 0.4 L/min $CO_2$ flow rate, and a foaming time of 50 s using the DFA100. That is, the applicable variables determined in Example 1.1 remained constant, but the concentration of SDS was varied at 5.0 mM, 6.0 mM, 7.0 mM, and 8.0 mM in water. The results are shown in FIG. 4. As shown, the results indicate that 8.0 mM SDS surfactant produces the most stable foam and best foam half-life.

Example 2: Optimization of Silica NP Functionalization

Example 2.1: Functionalization of Silica NPs with DMDES: In this Example, silica NPs (average diameter of 7 nm) were functionalized using DMDES, according to the chemical reaction shown below:

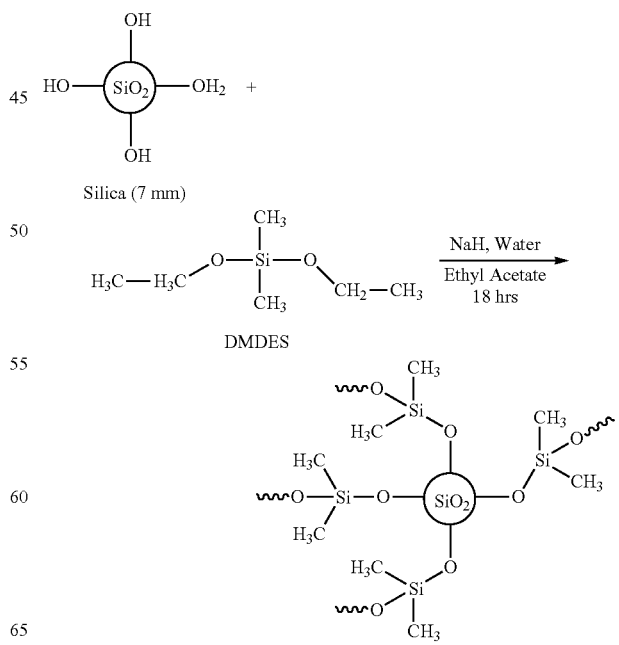

More specifically, the DMDES functionalized silica NPs were prepared, as follows: First, 20.0 milliliters (mL) of deionized water (DI water) was added to a 250 mL round bottom flask; 0.488 grams (g) of silica NPs (7 nm) was added to the flask; 160 mL of NaOH (10 mM stock solution) was added to the flask; contents of the flask was stirred for 20 min. Thereafter, 12.0 mL of ethyl acetate was added to the flask; 1.388 mL of DMDES was added to the flask; contents of the flask was stirred for 18 hours. The product was separated by centrifugation at 15,000 revolutions per minute (rpm) for 10 min, and washed with DI water to remove unwanted reactants and reagents; centrifugation and washing was repeated three (3) times to obtain partially hydrophobic silica NPs.

Example 2.2: Zeta Potential Measurements of DMDES Functionalized Silica NPs: In this Example, the optimization of a $CO_2$ foam treatment fluid was performed by testing the zeta potential between the DMDES functionalized silica NPs of Example 2.1 and a liquid medium (water). The zeta potential was tested without a surfactant to determine their feasibility and stability in the aqueous phase. The optimization methodology strives to achieve optimum HLB balance.

Figure 5A:
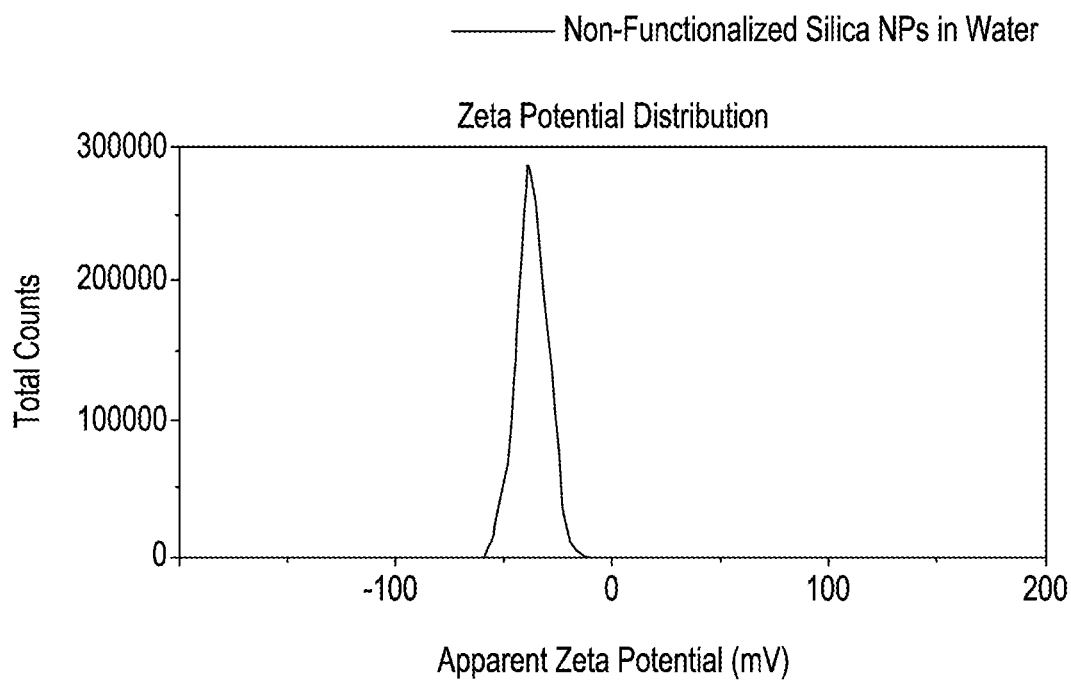
FIG. 5A is a graph evaluating the zeta potential of non-functionalized silica NPs.
Figure 5B:
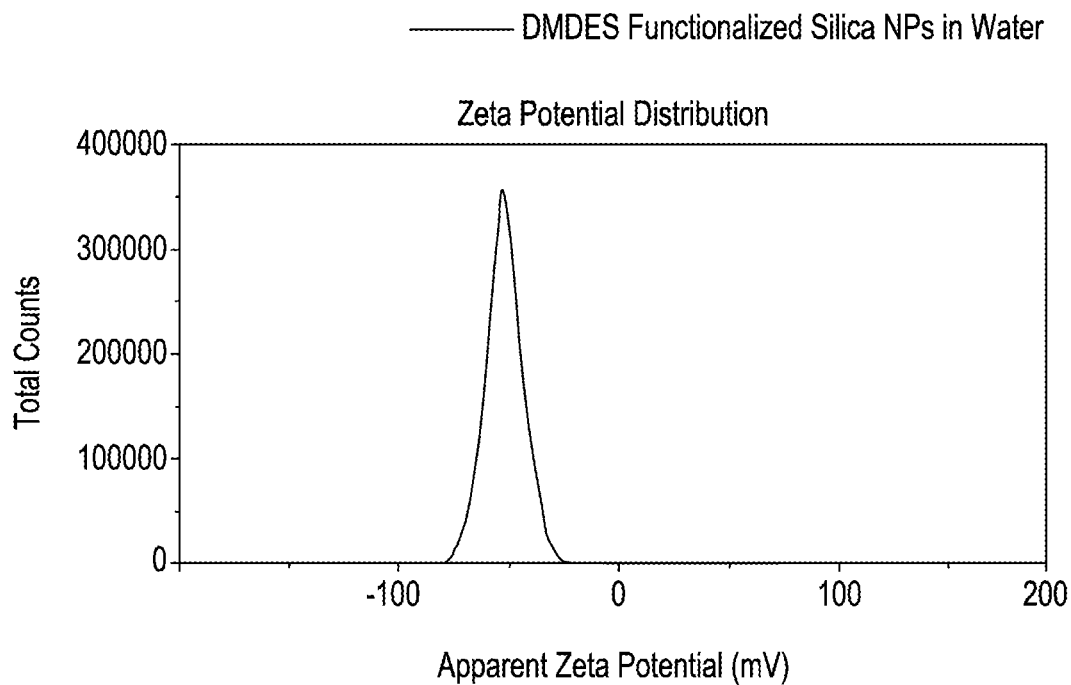
FIG. 5B is a graph evaluating the zeta potential of functionalized silica NPs, according to one or more principles of the present disclosure.

Zeta potential measurements were evaluated using non-functionalized silica NPs (average diameter of 7 nm) and the functionalized silica NPs prepared in Example 2.1 above in the presence of water using a ZETASIZER® dynamic light scattering instrument (DLS) (ZEN3600, Malvern, UK). The testing procedure involved dispersing the functionalized silica NPs in deionized water, followed by sonication for 10 minutes (UP400St, Germany). The sample was filled in a folded capillary Zeta Cell (DTS1070, Malvern, UK) having copper electrodes and tested on the ZETASIZER®. The results are shown in FIGS. 5A and 5B, respectfully. As shown in FIG. 5A, the non-functionalized silica NPs are negatively charged and exhibit a zeta potential of −36.9 mV (36.9 mV absolute value), whereas the functionalized silica NPs are negatively charged and exhibit a zeta potential of −52.1 mV (52.1 mV absolute value). Accordingly, the functionalization of the silica NPs improves their stability in at least an aqueous-based treatment fluid.

Example 3: Evaluation of Foam Stability of $CO_2$ Foam Treatment Fluids

Figure 6A:
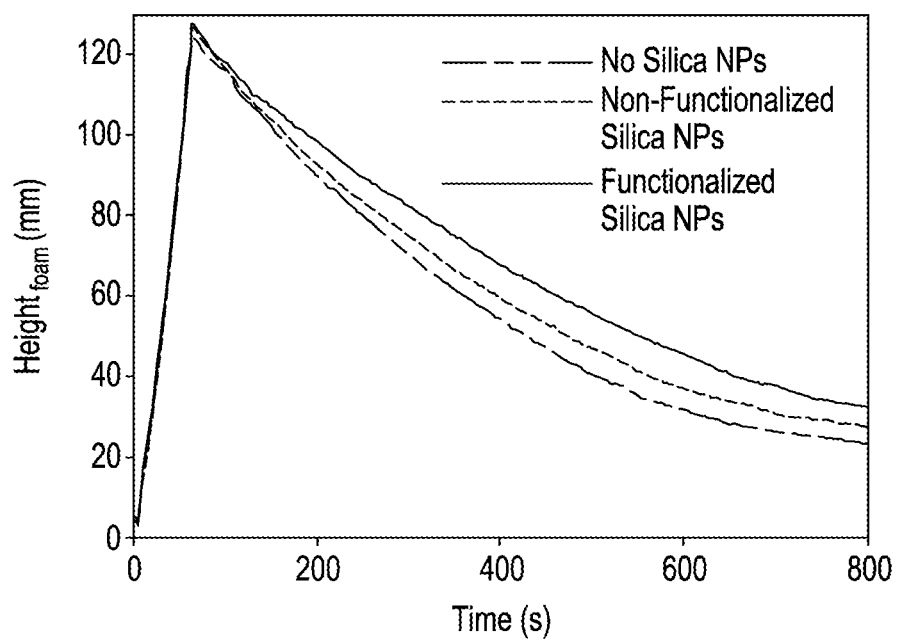
FIG. 6A is a graph evaluating the foam stability of surfactant compositions comprising no silica NPs, non-functionalized silica NPs, and functionalized silica NPs based on $CO_2$ foam height, the functionalized silica NPs according to one or more principles of the present disclosure.

In this Example, the foam stability of non-functionalized silica NPs was compared to functionalized silica NPs as prepared in Example 2.1, where all NPs had an average diameter of 7 nm. All NPs were tested at 0.01 wt. % in 0.8 mM CTAB in water at a $CO_2$ flow rate of 0.4 L/min using the DFA100 to examine foam height. A further control of 0.8 CTAB in water and $CO_2$ flow rate of 0.4 L/min without any silica NPs was evaluated, as well. Foaming time for all samples was 60 s. The results are shown in FIG. 6A. As shown, the functionalized silica NPs demonstrate superior stability and foam half-life compared to the non-functionalized silica NPs, while both demonstrate improved stability and foam half-life compared to having no silica NPs at all. Accordingly, the functionalized silica NPs of the present disclosure (0.01 wt. %) demonstrate improved foam stability, foam half-life, and foam height.

Figure 6B:
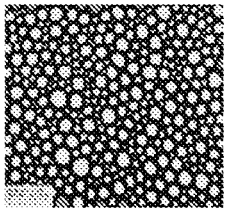
FIG. 6B are images visualizing the results of FIG. 6A.

The foam stability results of FIG. 6A was further imaged for visualization using by capturing 2D foam images using a USB camera (3.0) for foam structure analysis using a DFA100 after 63 s, 150 s, 250 s, 350 s, and 450 s of foam formation. The results are shown in FIG. 6B, the camera having a resolution of 1280×1027 pix and field of view of 25×13 mm. As shown, it is apparent that the foam stability of the $CO_2$ foam treatment fluids comprising the functionalized silica NPs is improved by controlling bubble size, inter-bubble gas diffusion, and foam lamellae. The data demonstrates that functionalized silica NPs with an optimum HLB value have the ability to improve foam stability.

Figure 7A:
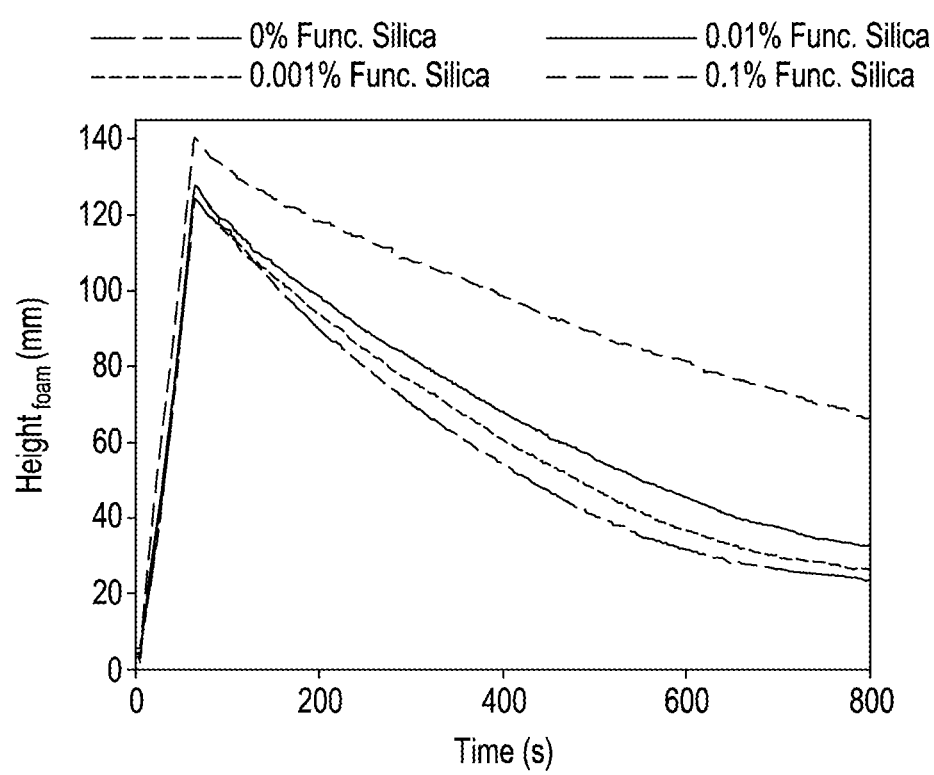
FIG. 7A is a graph evaluating the foam stability of surfactant compositions comprising no silica NPs, non-functionalized silica NPs, and functionalized silica NPs at varying concentrations based on $CO_2$ foam height, the functionalized silica NPs according to one or more principles of the present disclosure.

Example 4: Evaluation of Foam Stability of Varying Functionalized Silica NP Concentrations in $CO_2$ Foam Treatment Fluids In this Example, the foam stability of functionalized silica NPs (average diameter of 7 nm) as prepared in Example 2.1 was evaluated with varying functionalized silica NP concentrations of 0.001 wt. %, 0.01 wt. %, and 0.1 wt. % in 0.8 mM CTAB in water at a $CO_2$ flow rate of 0.4 L/min using the DFA100 to examine foam height. A further control of 0.8 CTAB in water and $CO_2$ flow rate of 0.4 L/min without any silica NPs was evaluated, as well. Foaming time for all samples was 60 s. The results are shown in FIG. 7A. As shown, as the concentration of functionalized silica NPs increases, foam stability and foam half-life increases. Moreover, the presence of functionalized silica NPs in any concentration demonstrated improved foam stability and foam half-life compared to a $CO_2$ foam treatment fluid having no silica NPs at all. Accordingly, the functionalized silica NPs of the present disclosure at high concentration (0.1 wt. %) demonstrate superior foam stability, foam half-life, and foam height.

The foam stability results of FIG. 7A was further imaged for visualization as described in Example 3 after 63 s, 150 s, 250 s, 350 s, 450 s, 550 s, 650 s, and 750 s of foam formation. The results are shown in FIG. 7B. As shown, the comparison indicates more compact, stable, and smaller size foam bubble formations during the initial timespan. The data demonstrates that functionalized silica NPs with an optimum HLB value have the ability to improve foam stability.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
   introducing a $CO_2$ foam treatment fluid into a subterranean formation, wherein the $CO_2$ foam treatment fluid comprises:
   a plurality of functionalized silanol group silica nanoparticles, the silanol group selected from the group consisting of an isolated silanol group, a vicinal silanol group, a geminaol silanol group, and any combination thereof;
   wherein the plurality of functionalized silanol group silica nanoparticles comprise crystalline silica; and
   a surfactant having a hydrophilic-lipophilic balance (HLB) value of 8 to 18;
   wherein the introducing hydraulically fractures the subterranean formation.

2. The method of claim 1, wherein the silanol group is functionalized with a silane.

3. The method of claim 1, wherein the silanol group is functionalized with a silane containing one or more of a propyl group, a methyl group, or an octyl group.

4. The method of claim 1, wherein the silanol group is functionalized with a silane selected from the group consisting of dimethyl diethoxy silane, 3-aminopropyl triethoxy silane, methyl poly(ethylene glycol) silane, ethoxy trimethyl silane, dimethoxy dimethyl silane, propyl triethoxy silane, trimethoxy propyl silane, octyl triethoxy silane, and any combination thereof.

5. The method of claim 1, wherein the surfactant is selected from the group consisting of an anionic surfactant, a cationic surfactant, a non-ionic surfactant, a zwitterionic surfactant, and any combination thereof.

6. The method of claim 1, wherein the surfactant is cetyltrimethyl ammonium bromide.

7. The method of claim 1, wherein the plurality of functionalized silanol group silica nanoparticles have an average diameter in the range of about 1 nanometer to about 100 nanometers.

8. The method of claim 1, wherein the $CO_2$ foam treatment fluid has an absolute value zeta potential in the range of about 30 millivolts to about 40 millivolts.

9. The method of claim 1, wherein the $CO_2$ foam treatment fluid is configured to form a foam height in the range of about 100 millimeters to about 200 millimeters.

* * * * *